(No Model.)
H. M. ROBBINS.
Cattle Tie.
No. 242,370. Patented May 31, 1881.
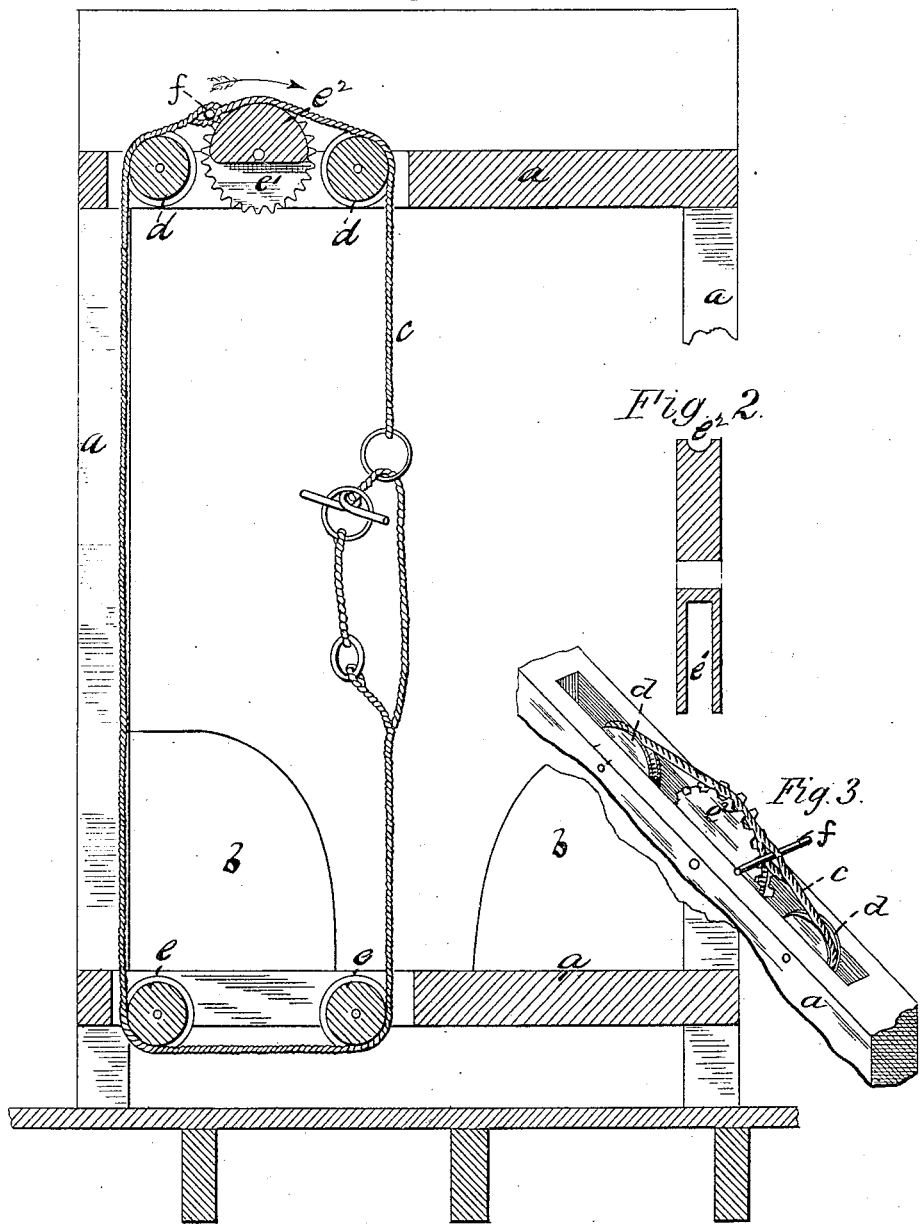
Witnesses.
Chas. L. Burdett.
James J. Greene
Inventor.
Henry M. Robbins
By W. E. Simonds
Atty.

UNITED STATES PATENT OFFICE.

HENRY M. ROBBINS, OF NEWINGTON, CONNECTICUT.

CATTLE-TIE.

SPECIFICATION forming part of Letters Patent No. 242,370, dated May 31, 1881.

Application filed February 21, 1881. (No model.)

*To all whom it may concern:*

Be it known that I, HENRY M. ROBBINS, of Newington, in the county of Hartford and State of Connecticut, have invented a certain new and useful Improvement in Cattle-Ties, of which the following is a description, reference being had to the accompanying drawings, where—

Figure 1 is a view of frame-work appurtenant to a stable-stall embodying my improvement, most of the timbers being shown in central longitudinal section for the purpose of exposing the pulleys and fastening-rope to view. Fig. 2 is a detail view of the take-up pulley, on an enlarged scale, in diametric cross-section. Fig. 3 is a perspective detached view of rope and pulley, with the stop.

The letters $a$ denote a frame-work appurtenant to a stall in a barn or stable at or near the manger, which, as matters are shown in the drawings, is behind the manger-front $b\ b$.

The letter $c$ denotes a rope, which may as well be a chain or other suitable substitute, which runs up over the pulleys $d$, then down under the pulleys $e$, then up again, with some suitable tying apparatus at the place where the two ends meet. I rather prefer the ring and bar with the loop shown in the drawings.

It will be readily understood that this arrangement gives the cow or other animal that is secured by it great freedom and ease in raising and dropping the head, getting up and lying down, turning the head sidewise sufficiently to lick herself, &c., but prevents the animal from unduly moving about.

The take-up pulley, which I will now describe, is designed to permit the creature to have a greater length of rope when lying down than when standing up. This pulley $e^2$ is mortised out on one side, by mortise $e'$, nearly to the center, the remaining part having the usual pulley-surface. The peripheral edges of the pulley are fluted or serrated. When the tying-loop is at the height proper for a standing position of the creature the take-up pulley stands with the solid half uppermost, as shown in the drawings, and the rope runs over the full height of the pulley. When the creature lies down the stop or cross-bar $f$, which may be adjustably set at any proper point in the rope, strikes into the serrations of the take-up pulley, rotates it, as denoted by the arrow, till the mortised half is uppermost, when the rope will drop into the mortise and give the creature an extra length of rope. When the creature rises the rope runs back and rotates the take-up pulley back to the position shown in the drawings, Figs. 1 and 3.

I claim as my invention—

1. The rope or chain $c$, provided with a suitable tying device, attached to supports overhead and underneath the tying device, and free to rise and fall, all substantially as described, and for the purpose set forth.

2. The combination of the rope or chain $c$, bearing a suitable tying device, and the cross-bar $f$, with the take-up pulley $e^2$ and the pulleys $d\ d$, all substantially as described, and for the purpose set forth.

HENRY M. ROBBINS.

Witnesses:
WM. E. SIMONDS,
JAMES J. GREENE.